US011889573B2

(12) United States Patent
Yoon

(10) Patent No.: US 11,889,573 B2
(45) Date of Patent: Jan. 30, 2024

(54) WIRELESS INTERCOMMUNICATION SYSTEM AND GROUP PAIRING METHOD OF INTERCOMMUNICATION SYSTEM

(71) Applicant: SENA TECHNOLOGIES INC., Seoul (KR)

(72) Inventor: Sung Won Yoon, Seoul (KR)

(73) Assignee: SENA TECHNOLOGIES INC., Seoul (KR)

( * ) Notice: Subject to any disclaimer, the term of this patent is extended or adjusted under 35 U.S.C. 154(b) by 363 days.

(21) Appl. No.: 17/292,272

(22) PCT Filed: Oct. 31, 2019

(86) PCT No.: PCT/KR2019/014546
§ 371 (c)(1),
(2) Date: May 7, 2021

(87) PCT Pub. No.: WO2020/141709
PCT Pub. Date: Jul. 9, 2020

(65) Prior Publication Data
US 2021/0410217 A1    Dec. 30, 2021

(30) Foreign Application Priority Data

Jan. 4, 2019    (KR) .......................... 10-2019-0001372

(51) Int. Cl.
*H04W 76/15*    (2018.01)
*H04W 76/14*    (2018.01)

(52) U.S. Cl.
CPC ........... *H04W 76/15* (2018.02); *H04W 76/14* (2018.02)

(58) Field of Classification Search
CPC ..... H04W 76/10; H04W 76/14; H04W 76/15; H04W 76/19; H04W 76/20; H04W 4/80;
(Continued)

(56) References Cited

U.S. PATENT DOCUMENTS

2011/0314168 A1    12/2011 Bathiche et al.
2015/0245167 A1*   8/2015 Bobrow ................ H04W 4/80
                                                   455/41.2
(Continued)

FOREIGN PATENT DOCUMENTS

EP          3573422 A1    11/2019
KR      10-1033170 B1      5/2011
(Continued)

OTHER PUBLICATIONS

SENA Technologies, Inc, "User's Guide Motorcycle Bluetooth Communication System", Nov. 21, 2014, URL: http://www.sena.com/wp-content/uploads/2014/11/UsersGuide_Sena_20S_v1.3_en_20141121.pdf.
(Continued)

*Primary Examiner* — Peter Chen
(74) *Attorney, Agent, or Firm* — NKL LAW; Jae Youn Kim

(57) ABSTRACT

A group pairing method of a wireless intercommunication system according to an embodiment may comprise the steps of: acquiring information about slave wireless intercommunication devices and generating a pairing list from the acquired information, and sorting the generated list according to a chain connection order; transmitting information about the sorted pairing list and chain connection order to a master wireless intercommunication device; the master wireless intercommunication device receiving the information about the sorted pairing list and chain connection order from the master mobile device and updating the pairing list thereof from the received pairing list, and transmitting information about the updated pairing list and chain connection order to the slave wireless intercommunication devices; and each of the slave wireless intercommunication devices receiving the information about the updated pairing list and chain connection order from the master wireless
(Continued)

intercommunication device and updating the pairing list thereof from the received pairing list, and sorting the updated pairing list according to the chain connection order.

6 Claims, 10 Drawing Sheets

(58) Field of Classification Search
CPC ..... H04W 84/18; H04W 84/20; H04W 8/005; H04W 12/50; H04W 12/55; H04M 9/001; H04M 1/72412; H04M 2250/02
See application file for complete search history.

(56) References Cited

U.S. PATENT DOCUMENTS

2018/0189025 A1* 7/2018 Tanaka .................. H04S 7/30
2020/0008048 A1* 1/2020 Takahashi ............. H04W 8/005

FOREIGN PATENT DOCUMENTS

| KR | 10-1352459 B1 | 1/2014 |
| KR | 10-1394972 B1 | 5/2014 |
| KR | 10-2014-0082223 A | 7/2014 |
| KR | 10-2016-0042569 A | 4/2016 |
| WO | 2018/135165 A1 | 7/2018 |

OTHER PUBLICATIONS

Andrea Sorrentino, "EP Search Report for EP Application No. 19907286", dated Jun. 23, 2022, EPO, Germany.

* cited by examiner

WIRELESS INTERCOMMUNICATION SYSTEM AND GROUP PAIRING METHOD OF INTERCOMMUNICATION SYSTEM

TECHNICAL FIELD

The present invention relates to wireless intercommunication technology.

BACKGROUND ART

A wireless intercommunication system is useful as an efficient auxiliary device for various group activities because it allows multipoint communication without user manipulation.

However, inconvenient manipulation of the wireless intercommunication devices is required to perform pairing between the wireless intercommunication devices constituting the wireless intercommunication system.

Accordingly, there is a need for a wireless intercommunication technology capable of easily performing pairing without manipulation of wireless intercommunication devices and managing a pairing list of other wireless intercommunication devices with a single operation.

A related prior art document is Korean Patent Publication No. 10-1352459.

Technical Problem

An object of the present invention is to provide a wireless intercommunication system and a group pairing method of a wireless intercommunication system.

Technical Solution

A group pairing method of a wireless intercommunication system according to an aspect may include the steps of: acquiring information on a slave wireless intercommunication device and generating a pairing list, the master mobile device sorting the generated pairing list according to a chain connection order, the master mobile device transmitting the sorted pairing list and chain connection order information to a master wireless intercommunication device, the master wireless intercommunication device receiving the sorted pairing list and the chain connection order information and updating a pairing list thereof based on the received pairing list, the master wireless intercommunication device transmitting the updated pairing list and the chain connection order information to the slave wireless intercommunication device, the slave wireless intercommunication device receiving the updated pairing list and the chain connection order information from the master wireless intercommunication device and updating a pairing list thereof based on the received pairing list, and the slave wireless intercommunication device sorting the updated pairing list according to the received chain connection order information.

The step of the master mobile device acquiring the information on the slave wireless intercommunication device and generating the pairing list may include the step of the master mobile device acquiring the information on the slave wireless intercommunication device using QR code, Bluetooth communication, text message, instant message, or the like.

The step of the master mobile device acquiring the information on the slave wireless intercommunication device and generating the pairing list may include the step of the master mobile device acquiring the information on the slave wireless intercommunication device through an inquiry scan method.

The step of the master mobile device sorting the generated pairing list may include the steps of the master mobile device designating a wireless intercommunication device connected before the master intercommunication device as number 1 in the pairing list and designating a wireless intercommunication device connected after the master wireless intercommunication device as number 2 in the pairing list according to the chain connection order.

The group pairing method of a wireless intercommunication system may further include the step of the slave wireless intercommunication device transmitting the pairing list to a slave mobile device.

A group pairing method of a wireless intercommunication system according to another aspect may include the steps of: acquiring information on slave wireless intercommunication devices and generating a pairing list, the master mobile device sorting the generated pairing list according to a chain connection order, the master mobile device transmitting the sorted pairing list and chain connection order information to a slave mobile device, the slave mobile device receiving the sorted pairing list and the chain connection order information from the master mobile device, updating an existing pairing list, and sorting the pairing list according to the chain connection order information, transmitting the sorted pairing list and the chain connection order information to the master wireless intercommunication device when the master wireless intercommunication device is wirelessly connected to the master mobile device, and the slave mobile device transmitting the sorted pairing list and the chain connection order information to the slave wireless intercommunication device when the slave wireless intercommunication device is wirelessly connected to the slave mobile device.

Advantageous Effects

Since it is possible to perform group pairing and manage a pairing list of other wireless intercommunication devices only by operating a mobile device that is wirelessly connected to the wireless intercommunication device, the user's convenience can be improved.

DESCRIPTION OF DRAWINGS

FIGS. 4 to 8 are diagrams for describing another embodiment of a group pairing process.

MODE FOR INVENTION

Figure 1:
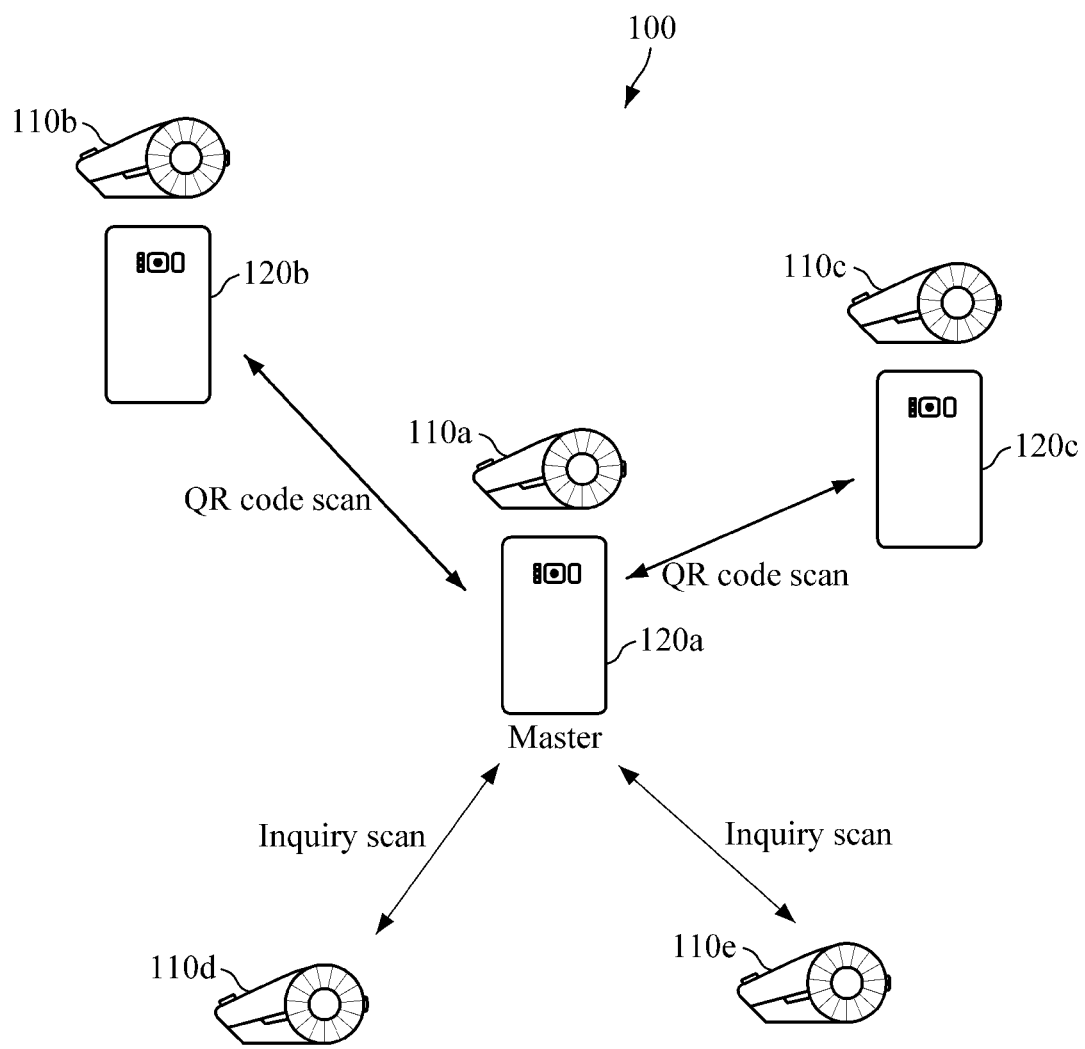
FIG. 1 is a diagram illustrating an embodiment of a wireless intercommunication system.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

It should also be noted that in some alternative implementations, the functions/acts noted may occur out of the order noted in the flowcharts. For example, two figures shown in succession may in fact be executed substantially concurrently or may sometimes be executed in the reverse order, depending upon the functionality/acts involved.

Some terms described below are defined in consideration of functions in the present invention, and meanings thereof may vary depending on, for example, a user or operator's intention or custom. Therefore, the meanings of terms should be interpreted based on the scope throughout this specification.

It will be understood that, although the terms first, second, etc., may be used herein to describe various elements, these elements should not be limited by these terms. These terms are only used to distinguish one element from another. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the elements or components in the following description are discriminated in accordance with their respective main functions. In other words, two or more elements may be made into one element or one element may be divided into two or more elements in accordance with a subdivided function. Additionally, each of the elements in the following description may perform a part or whole of the function of another element as well as its main function, and some of the main functions of each of the elements may be performed exclusively by other elements. Each element may be realized in the form of a hardware component, a software component, and/or a combination thereof.

FIG. 1 is a diagram illustrating an embodiment of a wireless intercommunication system.

Referring to FIG. 1, a wireless intercommunication system 100 may include a first wireless intercommunication device 110a, a second wireless intercommunication device 110b, a third wireless intercommunication device 110c, a fourth intercommunication device 110d, and a fifth wireless intercommunication device 110e, a first mobile device 120a, a second mobile device 120b, and a third mobile device 120c. The group intercommunication system 100 of FIG. 1 includes five wireless intercommunication devices 110a to 100e and three mobile devices 120a to 120c, but this is merely for convenience of description, and the number of wireless intercommunication devices and mobile devices is not particularly limited.

The first to fifth wireless intercommunication devices 110a to 110e may be wirelessly connected in a chain-like fashion through group pairing to form an intercommunication group and may perform the multipoint communication. In this case, the wireless communication between the wireless intercommunication devices 110a to 110e may be based on Bluetooth. Here, the wireless connection in a chain-like fashion may mean that devices are wireless connected in series as in a chain. For example, the wireless connection in a chain-like fashion may mean a way of connection in which the first wireless intercommunication device 110a is wirelessly connected to the second wireless intercommunication device 110b, the second wireless intercommunication device 110b, which is wirelessly connected to the first intercommunication device 110a, is wirelessly connected to the third wireless intercommunication device 110c, the third wireless intercommunication device 110c, which is wireless connected to the second wireless intercommunication device 110b, is wirelessly connected to the fourth wireless intercommunication device 110d, and the fourth wireless intercommunication device 110d, which is wirelessly connected to the third wireless intercommunication device 110c, is wirelessly connected to the fifth wireless intercommunication device 110e.

The first to third mobile devices 120a to 120c may be wirelessly connected to the first to third wireless intercommunication devices 110a to 110c, respectively, using low-power Bluetooth. For example, the first mobile device 120a may be connected to the first wireless intercommunication device 110a via Bluetooth, the second mobile device 120b may be connected to the second wireless intercommunication device 110b via Bluetooth, and the third mobile device 120c may be connected to the third wireless intercommunication device 110c via Bluetooth. Each of the mobile devices 120a to 120c may display intercommunication group information to which the wireless intercommunication device 110a to 110c connected thereto belongs, a pairing list, and the like.

Each of the wireless intercommunication devices 110a, 110b, 110c, 110d, and 110e may operate as a master wireless intercommunication device or a slave wireless intercommunication device according to a user's setting. In addition, each of the mobile devices 120a to 120c may operate as or a slave mobile device depending on whether the wireless intercommunication device connected thereto is a master wireless intercommunication device or a slave wireless intercommunication device.

Hereinafter, a group pairing process of the wireless intercommunication system will be described.

First Embodiment

A master mobile device may acquire information (e.g., names, bdaddr, etc.) of slave wireless intercommunication devices. For example, the master mobile device may acquire information on the slave wireless intercommunication devices using QR code, Bluetooth communication, text message, instant message, or the like, or acquire information on the slave wireless intercommunication devices through an inquiry scan method.

The master mobile device may generate a pairing list or update an existing pairing list based on the acquired information on the slave wireless intercommunication devices, and may sort the pairing list according to a set chain connection order. According to an embodiment, the master mobile device may sort the pairing list by designating a wireless intercommunication device connected before the master wireless intercommunication device as number 1 in the pairing list, designating a wireless intercommunication device connected after the master wireless intercommunication device as number 2 in the pairing list, and sequentially designating the remaining wireless intercommunication devices as subsequent numbers in the pairing list, according to the chain connection order. Meanwhile, when the master wireless intercommunication device is the first in the chain connection order, there is no wireless intercommunication device connected before the master wireless intercommunication device. In this case, the master mobile device may sort the pairing list by designating the wireless intercommunication device connected after the master intercommunication device as number 1 in the pairing list and sequentially designating the remaining wireless intercommunication devices as subsequent numbers in the pairing list. In addition, when the master wireless intercommunication device is the last in the chain connection order, there is no wireless intercommunication device connected after the master wireless intercommunication device. In this case, the master mobile device may sort the pairing list by designating the wireless intercommunication device connected before the master intercommunication device as number 1 in the pairing list and sequentially designating the remaining wireless intercommunication devices as subsequent numbers in the pairing list.

The master mobile device may transmit the sorted pairing list and chain connection order information to the master wireless intercommunication device wirelessly connected thereto.

The master wireless intercommunication device may receive the pairing list and the chain connection order information from the master mobile device and transmit the same to slave wireless intercommunication devices through a predetermined communication channel (e.g., RFCOMM). In addition, the master wireless intercommunication device may generate a pairing list or update an existing pairing list based on the received pairing list.

The slave wireless intercommunication device may receive the pairing list and the chain connection order information from the master intercommunication device, generate a pairing list or update an existing pairing list, and sort the pairing list according to the chain connection order. According to an embodiment, the slave wireless intercommunication device may sort the pairing list by designating a wireless intercommunication device connected before the slave wireless intercommunication device as number 1 in the pairing list, designating a wireless intercommunication device connected after the slave wireless intercommunication device as number 2 in the pairing list, and sequentially designating the remaining wireless intercommunication devices as subsequent numbers in the pairing list, according to the chain connection order. Meanwhile, when the slave wireless intercommunication device is the first in the chain connection order, there is no wireless intercommunication device connected before the slave intercommunication device. In this case, the slave wireless intercommunication device may sort the pairing list by designating the wireless intercommunication device connected after the slave wireless intercommunication device as number 1 in the pairing list and sequentially designating the remaining wireless intercommunication devices as subsequent numbers in the pairing list. In addition, when the slave wireless intercommunication device is the last in the chain connection order, there is no wireless intercommunication device connected after the slave wireless intercommunication device. In this case, the slave wireless intercommunication device may sort the pairing list by designating the wireless intercommunication device connected before the slave wireless intercommunication device as number 1 in the pairing list and sequentially designating the remaining wireless intercommunication devices as subsequent numbers in the pairing list.

The slave wireless intercommunication device may transmit the sorted pairing list and chain connection order information to a slave mobile device wirelessly connected thereto.

The master wireless intercommunication device and the slave wireless intercommunication device may be wirelessly connected in a chain-like fashion according to a predetermined command and may form an intercommunication group to perform multipoint communication.

Second Embodiment

A master mobile device may acquire information (e.g., names, bdaddr, etc.) of slave wireless intercommunication devices. For example, the master mobile device may acquire information on the slave wireless intercommunication devices using QR code, Bluetooth communication, text message, instant message, or the like, or acquire information on the slave wireless intercommunication devices through an inquiry scan method.

The master mobile device may generate a pairing list or update an existing pairing list based on the acquired information on the slave wireless intercommunication devices, and may sort the pairing list according to a set chain connection order. According to an embodiment, the master mobile device may sort the pairing list by designating a wireless intercommunication device connected before the master wireless intercommunication device as number 1 in the pairing list, designating a wireless intercommunication device connected after the master wireless intercommunication device as number 2 in the pairing list, and sequentially designating the remaining wireless intercommunication devices as subsequent numbers in the pairing list, according to the chain connection order. When the master intercommunication device is the first in the chain connection order, the master mobile device may sort the pairing list by designating the wireless intercommunication device connected after the master intercommunication device as number 1 in the pairing list and sequentially designating the remaining wireless intercommunication devices as subsequent numbers in the pairing list. In addition, when the master intercommunication device is the last in the chain connection order, the master mobile device may sort the pairing list by designating the wireless intercommunication device connected before the master intercommunication device as number 1 in the pairing list and sequentially designating the remaining wireless intercommunication devices as subsequent numbers in the pairing list.

The master mobile device may transmit the sorted pairing list and chain connection order information to a slave mobile device.

The slave mobile device may receive the pairing list and the chain connection order information from the master mobile device, generate a pairing list or update an existing pairing list, and sort the pairing list according to the chain connection order. According to an embodiment, the slave mobile device may sort the pairing list by designating a wireless intercommunication device connected before a slave wireless intercommunication device wirelessly connected thereto as number 1 in the paring list, designating a wireless intercommunication device connected after the slave wireless intercommunication device wirelessly connected thereto as number 2 in the pairing list, and sequentially designating the remaining wireless intercommunication devices as subsequent numbers in the pairing list, according to the chain connection order. Meanwhile, when the slave wireless intercommunication device wirelessly connected to the slave mobile device is the first in the chain connection order, the slave mobile device may sort the pairing list by designating the wireless intercommunication device connected after the slave wireless intercommunication device wirelessly connected to the slave mobile device as number 1 in the pairing list and sequentially designating the remaining wireless intercommunication devices as subsequent numbers in the pairing list. Meanwhile, when the slave wireless intercommunication device wirelessly connected to the slave mobile device is the last in the chain connection order, the slave mobile device may sort the pairing list by designating the wireless intercommunication device connected before the slave wireless intercommunication device wirelessly connected to the slave mobile device as number 1 in the pairing list and sequentially designating the remaining wireless intercommunication devices as subsequent numbers in the pairing list.

When the master wireless intercommunication device is wirelessly connected to the master mobile device, the master wireless intercommunication device may receive the pairing list and the chain connection order information from the master mobile device and generate a pairing list or update an existing pairing list.

When the slave wireless intercommunication device is wirelessly connected to the slave mobile device, the slave wireless intercommunication device may receive the pairing list and the chain connection order information from the slave mobile device and generate a pairing list or update an existing pairing list.

The master wireless intercommunication device and the slave wireless intercommunication device may be wirelessly connected in a chain-like fashion according to a predetermined command and may form an intercommunication group to perform multipoint communication.

Hereinafter, an embodiment of a group pairing process will be described with reference to FIGS. 2 to 4.

Figure 2:
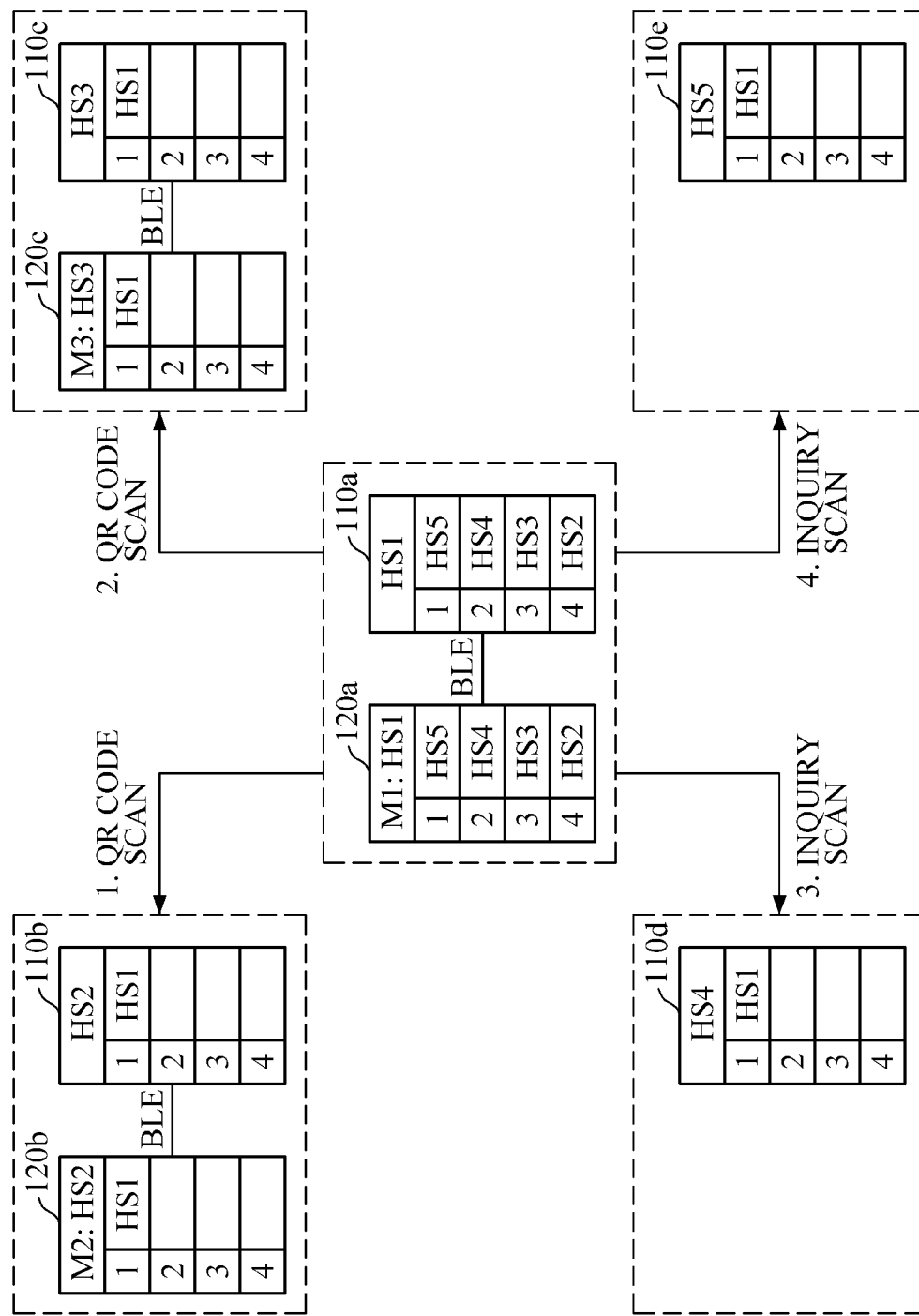
FIGS. 2 to 4 are diagrams for describing an embodiment of a group pairing process.
Figure 3:
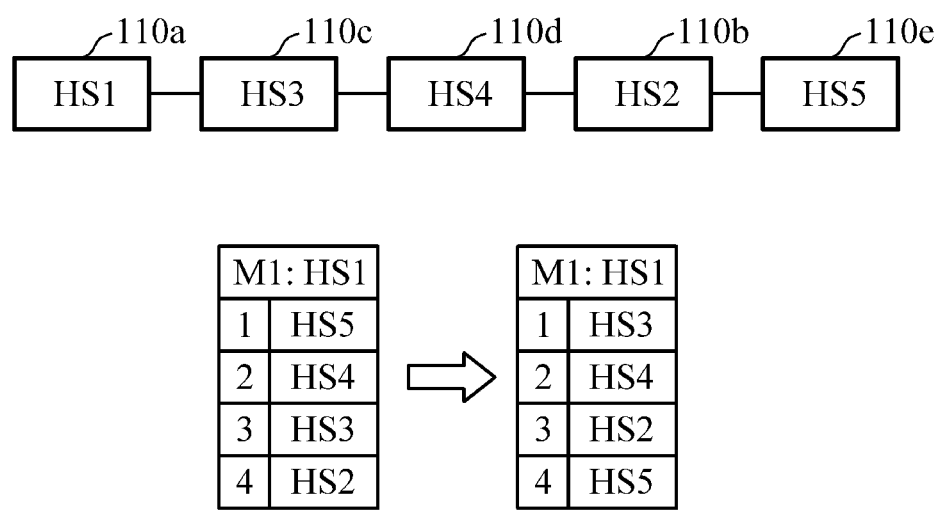
Figure 4:
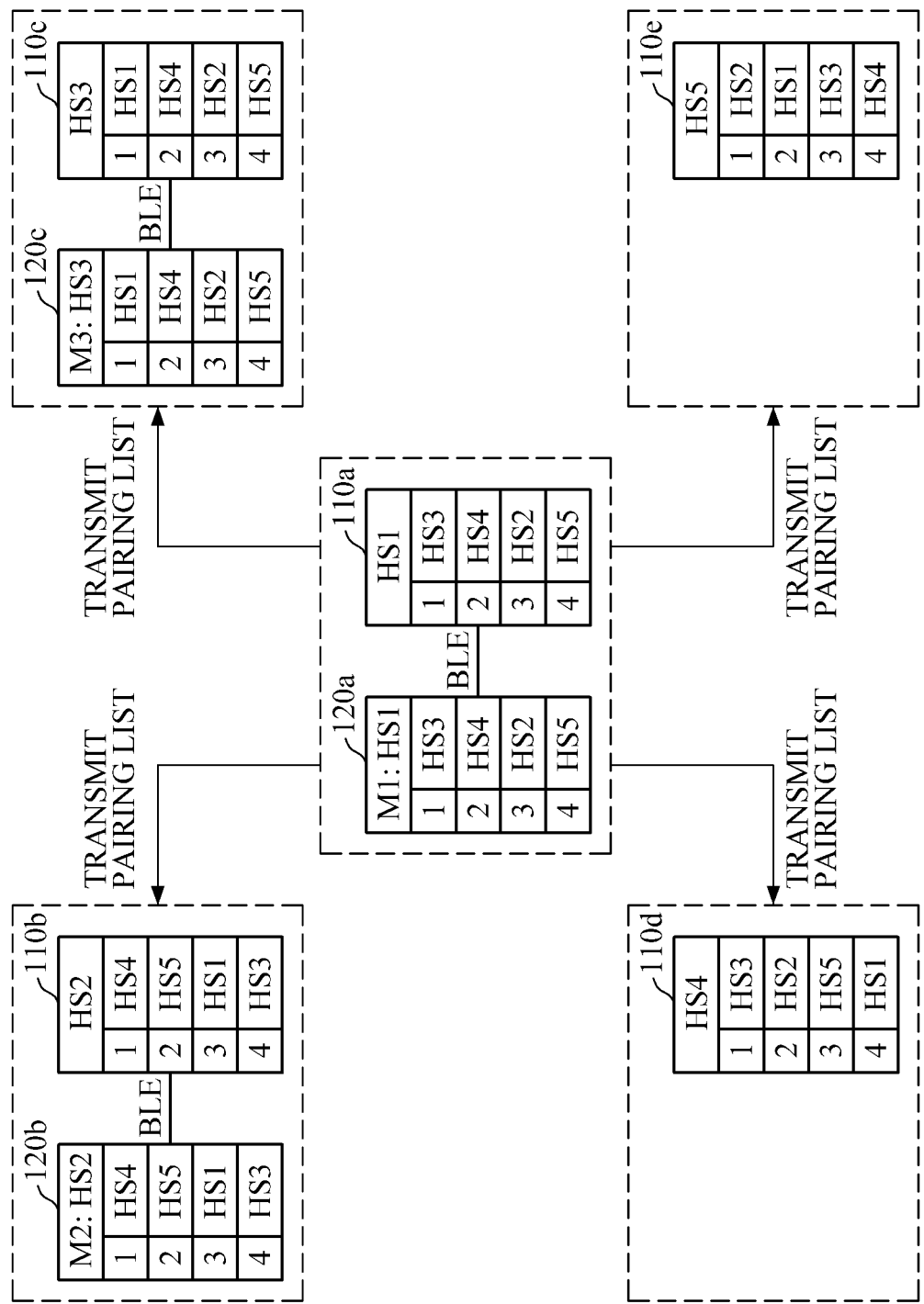

FIGS. 2 to 4 are diagrams for describing a group pairing process according to an embodiment. For convenience of description, by way of example, the first wireless intercommunication device 110a operates as a master wireless intercommunication device, the second to fifth wireless intercommunication devices 110b to 110e operate as slave wireless intercommunication devices, the first wireless intercommunication device 110a is wirelessly connected to the first mobile device 120a, the second wireless intercommunication device 110b is wirelessly connected to the second mobile device 120a, and the third wireless intercommunication device 110c is wirelessly connected to the third mobile device 120c. Referring to FIG. 2, the first mobile device 120a may acquire information on the second to fifth wireless intercommunication devices 110b to 110e, and transmit the acquired information on the second to fifth wireless intercommunication devices 110b to 110e to the first wireless intercommunication device 110a. According to an embodiment, the first mobile device 120a may acquire information on the second wireless intercommunication device 110b from the second mobile device 120b and acquire information on the third wireless intercommunication device 110c from the third mobile device 120c using QR code, Bluetooth communication, text message, instant message, or the like. In addition, the first mobile device 120a may acquire information on the fourth wireless intercommunication device 110d and the fifth wireless intercommunication device 110e through an inquiry scan method. When the first mobile device 120a acquires information on each of the second to fifth intercommunication devices 110b to 110e, the second to fifth wireless intercommunication devices 110b to 110e may acquire information on the first wireless intercommunication device 110a in response thereto.

According to an embodiment, the wireless intercommunication devices 110b and 110c wirelessly connected to the mobile devices may acquire information on the first wireless intercommunication device 110a through a communication between the mobile devices or through a communication between the wireless intercommunication devices. For example, when the first mobile device 120a acquires the information on the second wireless intercommunication device 110b, the first wireless intercommunication device 110a may transmit the information on the first wireless intercommunication device 110a to the second wireless intercommunication device 110b through a predetermined communication channel (e.g., RFCOMM). The second wireless intercommunication device 110b may receive the information on the first wireless intercommunication device 110a from the first wireless intercommunication device 110a to acquire the information on the first wireless intercommunication device 110a, and may transmit the information on the first wireless intercommunication device 110a to the second mobile device 120b. In another example, when the first mobile device 120a acquires the information on the second wireless intercommunication device 110b, the first mobile device 120a may transmit the information on the first wireless intercommunication device 110a to the second mobile device 120b through low-power Bluetooth communication, and the second mobile device 120b may receive the information on the first wireless intercommunication device 110a and transmit the same to the second wireless intercommunication device 110b. The second wireless intercommunication device 110b may receive the information on the first wireless intercommunication device 110a from the second mobile device 120b and acquire the information on the first wireless intercommunication device 110a. On the other hand, the third wireless intercommunication device 110c may also acquire the information on the first wireless intercommunication device 110a in a similar method as described above.

According to another embodiment, the wireless intercommunication devices 110d and 110e that are not wirelessly connected to the mobile devices may acquire the information on the first wireless intercommunication device 110a through a communication between the wireless intercommunication devices. For example, when the first mobile device 120a acquires the information on the fourth wireless intercommunication information 110d, the first wireless intercommunication device 110a may transmit the information on the first wireless intercommunication device 110a to the fourth wireless intercommunication device 110d through a predetermined communication channel (e.g., RFCOMM), and the fourth wireless intercommunication device 110d may receive the information on the first wireless intercommunication device 110a from the first wireless intercommunication device 110a and acquire the information on the first wireless intercommunication device 110a. Meanwhile, the fifth wireless intercommunication device 110e may also acquire the information on the first wireless intercommunication device 110a in a similar method as described above. The first mobile device 120a may generate a pairing list or update an existing pairing list based on the acquired information on the second to fifth wireless intercommunication devices 110b to 110e and may transmit the generated or updated pairing list to the first wireless intercommunication device 110a wirelessly connected to the first mobile device 120a. The first wireless intercommunication device 110a may receive the pairing list from the first mobile device 120a and generate a pairing list or update its own existing pairing list.

Referring to FIG. 3, a user may set the chain connection order in the following order: the first wireless intercommunication device 110a—the third wireless intercommunication device 110c—the fourth wireless intercommunication device 110d—the second wireless intercommunication device 110b—the fifth wireless intercommunication device 110e. In this case, since the first wireless intercommunication device 110a is the first in the chain connection order, the first mobile device 120a may sort a pairing list according to the chain connection order by designating the third wireless intercommunication device 110c connected after the first wireless intercommunication device 110a as number 1 in the pairing list, designating the fourth wireless intercommunication device 110d as number 2 in the pairing list, designating the second wireless intercommunication device 110b as number 3 in the pairing list, and designating the fifth wireless intercommunication device 110e as number 4 in the pairing list.

Referring to FIG. 4, the first mobile device 120a may transmit the pairing list sorted according to the chain connection order and chain connection order information to the first wireless intercommunication device 110a, and the first wireless intercommunication device 110a may receive the pairing list sorted according to the chain connection order and the chain connection order information and update its existing pairing list.

The first wireless intercommunication device 110a may transmit the updated pairing list and chain connection order information to the second to fifth wireless intercommunication devices 110b to 110e through a predetermined communication channel (e.g., RFCOMM).

The second to fifth wireless intercommunication devices 110b to 110e may receive the pairing list and the chain connection order information from the first wireless intercommunication device 110a, generate a pairing list or update their existing pairing list, and sort the updated pairing list according to the chain connection order information. In this case, each of the second to fifth wireless intercommunication devices 110b to 110e may designate the wireless intercommunication device connected before the wireless intercommunication device itself as number 1 in the pairing list and designate the wireless intercommunication device connected after the wireless intercommunication device itself as number 2 in the pairing list, according to the chain connection order.

The second wireless intercommunication device 110b may transmit a sorted pairing list and the chain connection order information to the second mobile device 120b wirelessly connected thereto, and the third wireless intercommunication device 110c may transmit a sorted pairing list and the chain connection order information to the third mobile device 120c wirelessly connected thereto.

Meanwhile, according to an embodiment, the second mobile device 120b and the third mobile device 120c may acquire the sorted pairing list and the chain connection order information from the first mobile device 120a through low-power Bluetooth according to the chain connection order. For example, each of the second mobile device 120b and the third mobile device 120c may receive the sorted pairing list and the chain connection order information from the first mobile device 120a according to the chain connection order, generate a pairing list or update their existing pairing list, and sort the pairing list according to the chain connection order information. Each of the second mobile device 120b and the third mobile device 120c may transmit the sorted pairing list and the chain connection order information to the second wireless intercommunication device 110b and the third wireless intercommunication device 110c wirelessly connected thereto, respectively.

FIGS. 5 to 8 are diagrams for describing another embodiment of a group pairing process. For convenience of description, by way of example, a first wireless intercommunication device 510a operates as a master wireless intercommunication device, the second to fifth wireless intercommunication devices 510b to 510e operate as slave wireless intercommunication devices, the first wireless intercommunication device 510a is wirelessly connected to a first mobile device 520a, the second wireless intercommunication device 510b is wirelessly connected to a second mobile device 520b, the third wireless intercommunication device 510c is wirelessly connected to a third mobile device 520c, the fourth wireless intercommunication device 510d is wirelessly connected to a fourth mobile device 520d, and the fifth wireless intercommunication device 510e is wirelessly connected to a fifth mobile device 520e.

Figure 5:
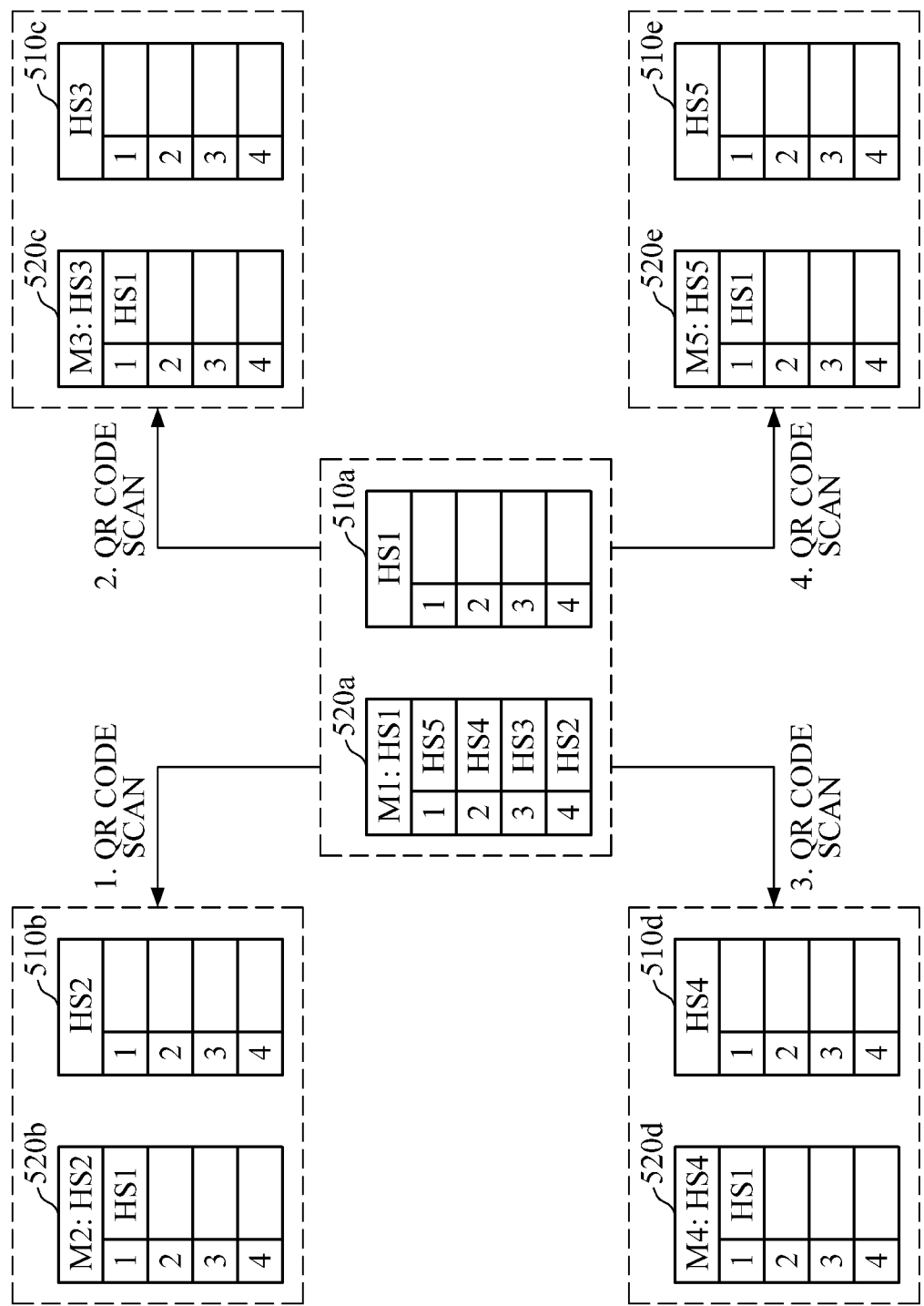

Referring to FIG. 5, the first mobile device 520a may acquire information on the second to fifth wireless intercommunication devices 510b to 510e and generate a pairing list or update an existing pairing list based on the acquired information on the second to fifth wireless intercommunication devices 510b to 510e. According to an embodiment, the first mobile device 520a may acquire the information on the second to fifth wireless intercommunication devices 510b to 510e from each of the second to fifth mobile devices 520b to 520e using QR code, Bluetooth communication, text message, instant message, or the like.

When the first mobile device 520a acquires information on each of the second to fifth wireless intercommunication devices 510b to 510e, the second to fifth mobile devices 520b to 520e may acquire information on the first wireless intercommunication device 510a in response thereto.

According to an embodiment, each of the second to fifth mobile devices 520b to 520e may acquire the information on the first wireless intercommunication device 510a through low-power Bluetooth communication with the first mobile device 520a. For example, when the first mobile device 520a acquires the information on the second wireless intercommunication device 510b, the first mobile device 520a may transmit the information on the first wireless intercommunication device 510a to the second mobile device 520b using low-power Bluetooth, and the second mobile device 520b may receive the information on the first wireless intercommunication device 510a from the first mobile device 520a and acquire the information on the first wireless intercommunication device 510a. Other mobile devices 520c to 520e may also acquire the information on the first wireless intercommunication device 510a in a similar method as described above.

Figure 6:
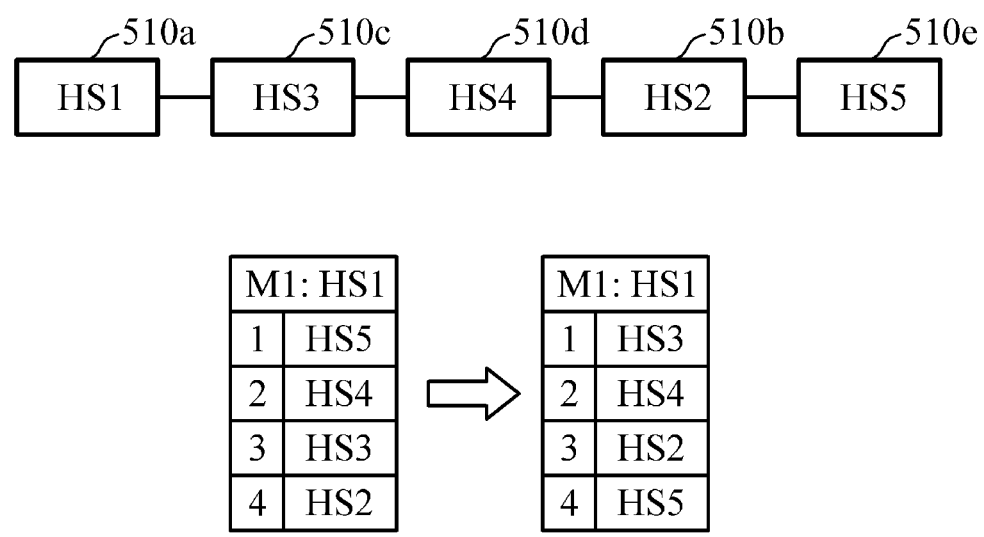

Referring to FIG. 6, a user may set the chain connection order in the following order: the first wireless intercommunication device 510a—the third wireless intercommunication device 510c—the fourth wireless intercommunication device 510d—the second wireless intercommunication device 510b—the fifth wireless intercommunication device 510e. In this case, since the first wireless intercommunication device 510a is the first in the chain connection order, the first mobile device 520a may sort a pairing list according to the chain connection order by designating the third wireless intercommunication device 510c connected after the first wireless intercommunication device 510a as number 1 in the pairing list, designating the fourth wireless intercommunication device 510d as number 2 in the pairing list, designating the second wireless intercommunication device 510b as number 3 in the pairing list, and designating the fifth wireless intercommunication device 510e as number 4 in the pairing list.

Figure 7:
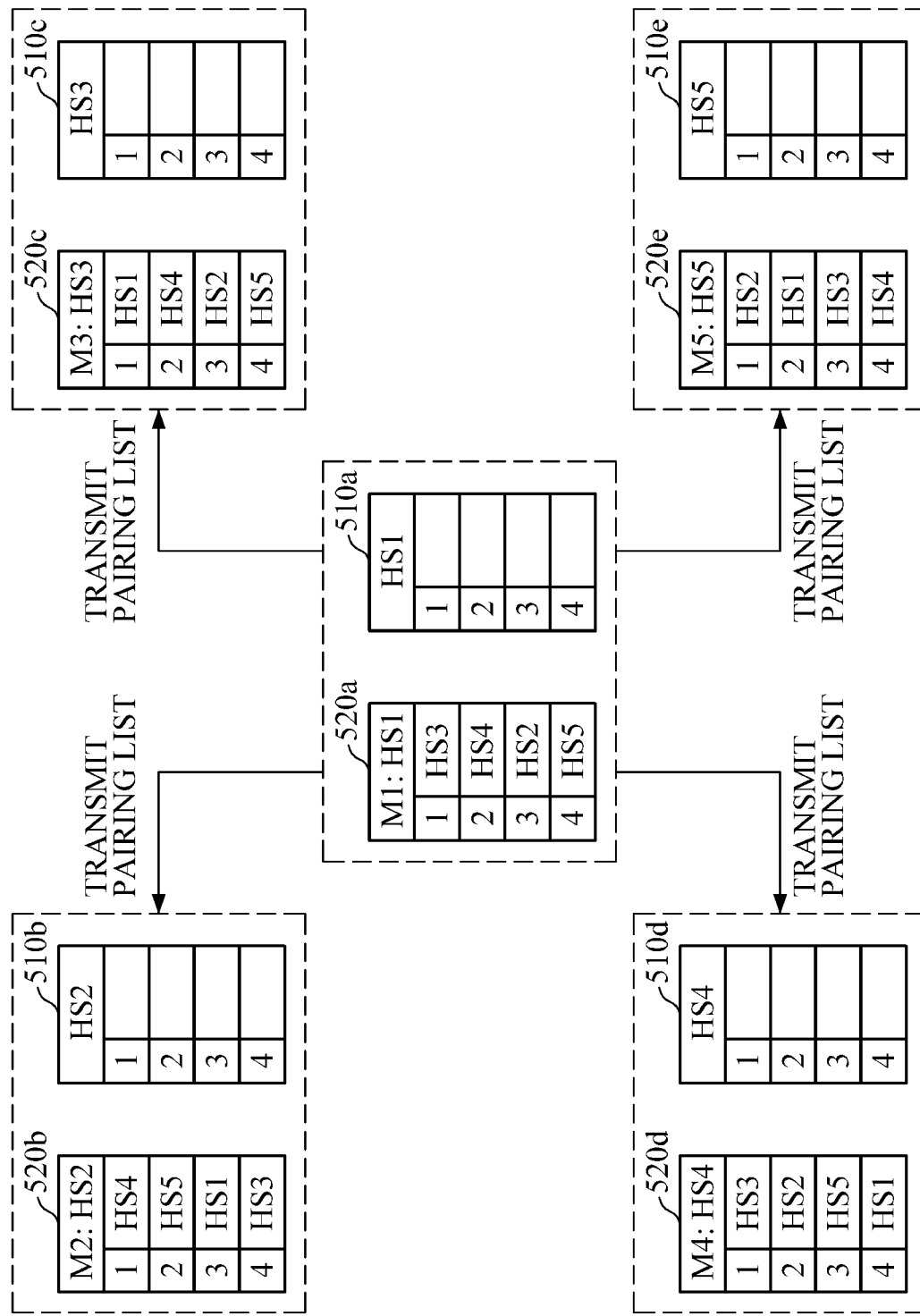

Referring to FIG. 7, the first mobile device 520a may transmit the pairing list sorted according to the chain connection order and chain connection order information to the second to fifth mobile devices 520b to 520e through low-power Bluetooth communication.

The second to fifth mobile devices 520b to 520e may receive the pairing list and the chain connection order information from the first mobile device 520a, generate a pairing list or update their existing pairing list, and sort the pairing list according to the chain connection order information. In this case, each of the second to fifth mobile devices 520b to 520e may designate the wireless intercommunication device connected before the wireless intercommunication device to be wirelessly connected to the mobile device itself as number 1 in the pairing list and designate the wireless intercommunication device connected after the wireless intercommunication device to be wirelessly connected to the mobile device itself as number 2 in the pairing list, according to the chain connection order.

Figure 8:
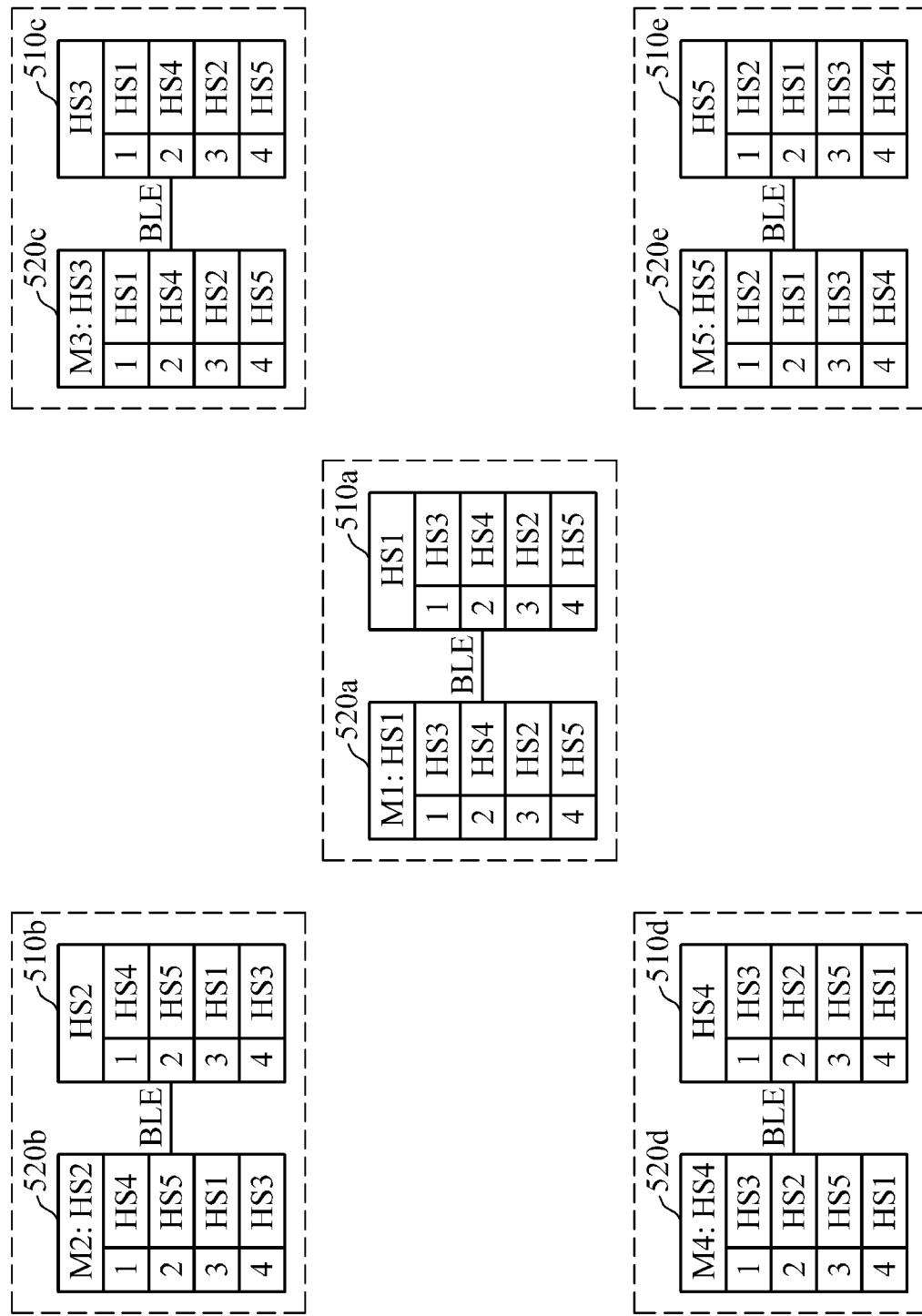

Referring to FIG. 8, when each of the wireless intercommunication devices 510a to 510e is wirelessly connected to each corresponding mobile device 520a to 520e, each of the mobile devices 520a to 520e may transmit the pairing list sorted according to the chain connection order and chain connection order information to the wireless intercommunication device 510a to 510e wirelessly connected thereto. Each of the wireless intercommunication devices 510a to 510e may receive the pair list sorted according to the chain connection order and the chain connection order information from the mobile device 520a to 520e connected thereto and generate a pairing list or update its existing pairing list.

Figure 9:
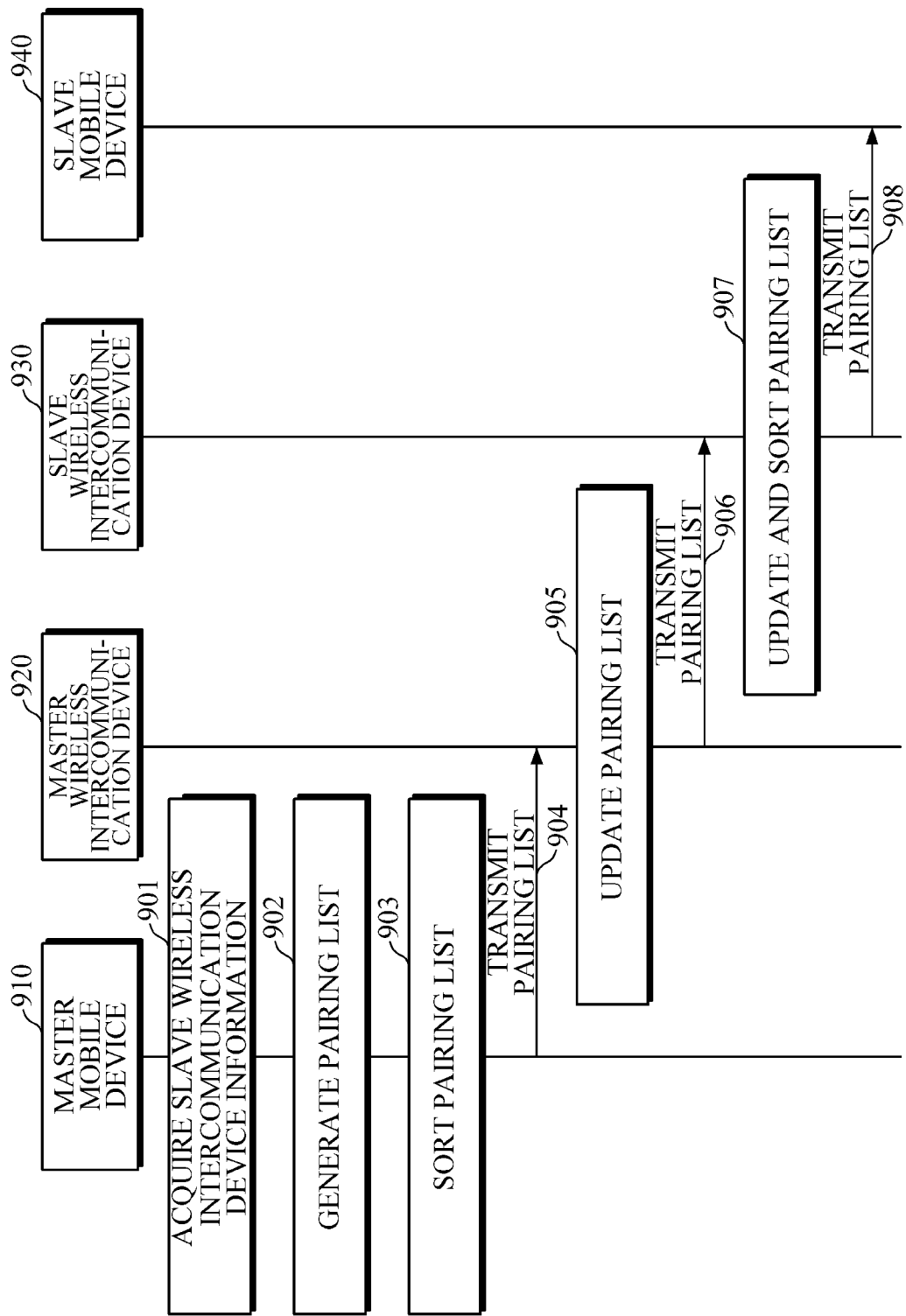
FIG. 9 is a diagram illustrating an embodiment of a group pairing method of a wireless intercommunication system.

FIG. 9 is a diagram illustrating an embodiment of a group pairing method of a wireless intercommunication system.

Referring to FIG. 9, 910 may acquire slave wireless intercommunication device information (e.g., name, bdaddr, etc.) (901). For example, the master mobile device 910 may acquire slave wireless intercommunication device information using QR code, Bluetooth communication, text message, instant message, or the like, or through an inquiry scan method.

The master mobile device 910 may generate a pairing list or update an existing pairing list based on the acquired slave wireless intercommunication device information (902), and may sort the pairing list according to a set chain connection order (903). For example, the master mobile device 910 may sort the pairing list by designating a wireless intercommunication device connected before a master wireless intercommunication device 920 as number 1 in the pairing list, designating a wireless intercommunication device connected after the master wireless intercommunication device 920 as number 2 in the pairing list, and sequentially designating the remaining wireless intercommunication devices as subsequent numbers in the pairing list, according to the chain connection order. When the master intercommunication device 920 is the first in the chain connection order, the master mobile device 910 may sort the pairing list by designating the wireless intercommunication device connected after the master intercommunication device 920 as number 1 in the pairing list and sequentially designating the remaining wireless intercommunication devices as subsequent numbers in the pairing list. In addition, when the master intercommunication device 920 is the last in the chain connection order, the master mobile device 910 may sort the pairing list by designating the wireless intercommunication device connected before the master intercommunication device 920 as number 1 in the pairing list and sequentially designating the remaining wireless intercommunication devices as subsequent numbers in the pairing list.

The master mobile device 910 may transmit the sorted pairing list and chain connection order information to the master wireless intercommunication device 920 wirelessly connected thereto (904).

The master wireless intercommunication device 920 may receive the pairing list and the chain connection order information from the master mobile device 910 and generate a pairing list or update an existing pairing list (905).

The master wireless intercommunication device 920 may transmit the generated or updated pairing list and the chain connection order information to a slave wireless intercommunication device 930 through a predetermined communication channel (e.g., RFCOMM) (906).

The slave wireless intercommunication device 930 may receive the pairing list and the chain connection order information from the master wireless intercommunication device 920, generate a pairing list or update an existing pairing list, and sort the generated or updated pairing list according to the received chain connection order information (907). According to an embodiment, the slave wireless intercommunication device 930 may sort the pairing list by designating a wireless intercommunication device connected before the slave wireless intercommunication device 930 as number 1 in the pairing list, designating a wireless intercommunication device connected after the slave wireless intercommunication device 930 as number 2 in the pairing list, and sequentially designating the remaining wireless intercommunication devices as subsequent numbers in the pairing list, according to the chain connection order. When the slave wireless intercommunication device 930 is the first in the chain connection order, the slave wireless intercommunication device 930 may sort the pairing list by designating the wireless intercommunication device connected after the slave wireless intercommunication device 930 as number 1 in the pairing list and sequentially designating the remaining wireless intercommunication devices as subsequent numbers in the pairing list. When the slave wireless intercommunication device 930 is the last in the chain connection order, the slave wireless intercommunication device 930 may sort the pairing list by designating the wireless intercommunication device connected before the slave wireless intercommunication device 930 as number 1 in the pairing list and sequentially designating the remaining wireless intercommunication devices as subsequent numbers in the pairing list.

The slave wireless intercommunication device 930 may transmit the sorted pairing list and chain connection order information to a slave mobile device 940 wirelessly connected thereto (908).

Figure 10:
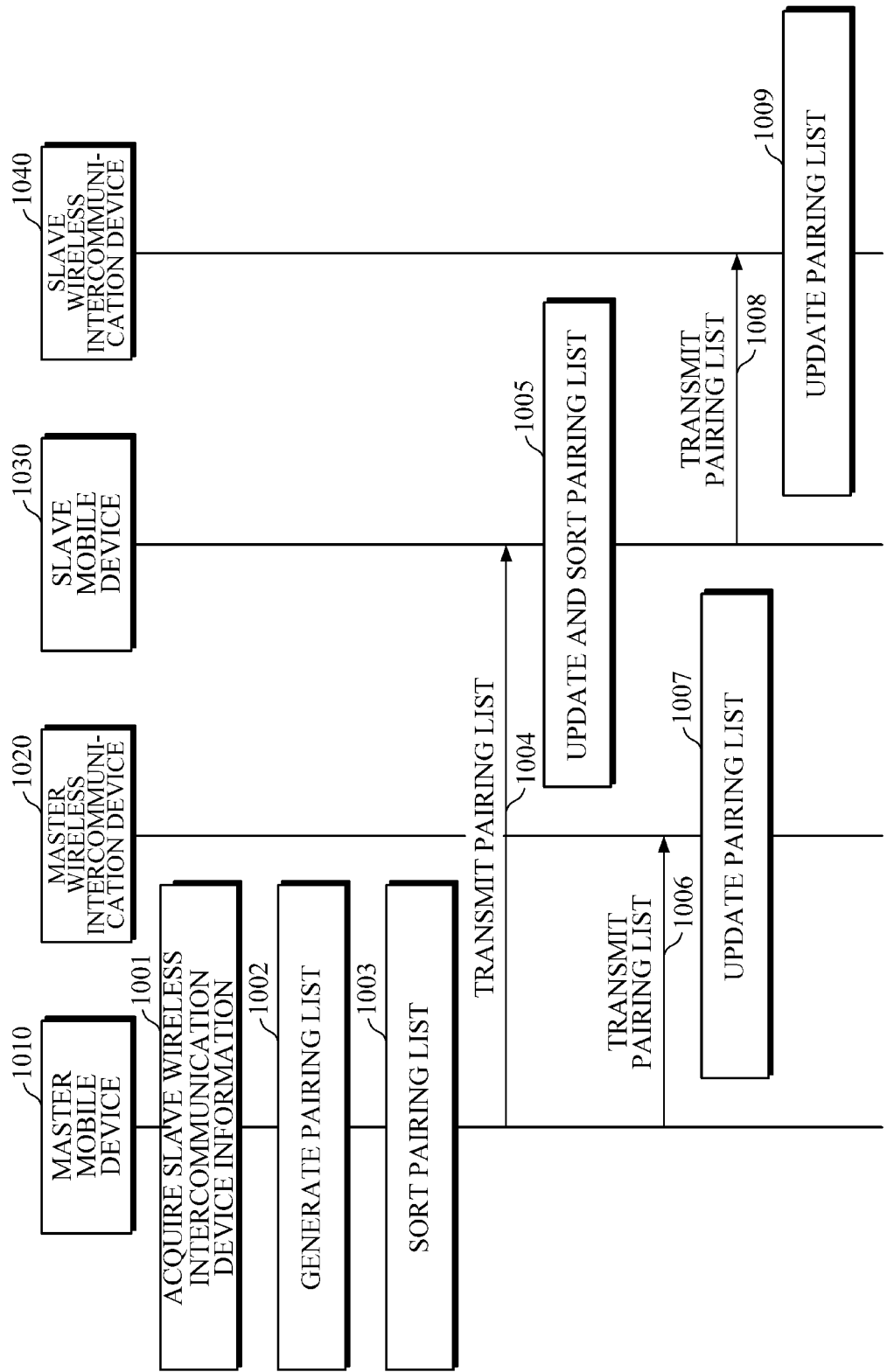
FIG. 10 is a diagram illustrating another embodiment of a group pairing method of a wireless intercommunication system.

FIG. 10 is a diagram showing another embodiment of a group pairing method of a wireless intercommunication system.

Referring to FIG. 10, 1010 may acquire slave wireless intercommunication device information (e.g., name, bdaddr, etc.) (1001). For example, the master mobile device 1010 may acquire slave wireless intercommunication device information using QR code, Bluetooth communication, text message, instant message, or the like.

The master mobile device 1010 may generate a pairing list or update an existing pairing list based on the acquired slave wireless intercommunication device information (1002), and may sort the pairing list according to a set chain connection order (1003). For example, the master mobile device 1010 may sort the pairing list by designating a wireless intercommunication device connected before a master wireless intercommunication device 1020 as number 1 in the pairing list, designating a wireless intercommunication device connected after the master wireless intercommunication device 1020 as number 2 in the pairing list, and sequentially designating the remaining wireless intercommunication devices as subsequent numbers in the pairing list, according to the chain connection order. When the master intercommunication device 1020 is the first in the chain connection order, the master mobile device 1010 may sort the pairing list by designating the wireless intercommunication device connected after the master intercommunication device 1020 as number 1 in the pairing list and sequentially designating the remaining wireless intercommunication devices as subsequent numbers in the pairing list. In addition, when the master intercommunication device 1020 is the last in the chain connection order, the master mobile device 1010 may sort the pairing list by designating the wireless intercommunication device connected before the master intercommunication device 1020 as number 1 in the pairing list and sequentially designating the remaining wireless intercommunication devices as subsequent numbers in the pairing list.

The master mobile device 1010 may transmit the sorted pairing list and chain connection order information to a slave mobile device 1030 through low-power Bluetooth communication (1004).

The slave mobile device 1030 may receive the pairing list and the chain connection order information from the master mobile device 1010, generate a pairing list or update an existing pairing list, and sort the generated or updated pairing list according to the received chain connection order information (1005). According to an embodiment, the slave mobile device 1030 may sort the pairing list by designating a wireless intercommunication device connected before a slave wireless intercommunication device 1040 to be wirelessly connected thereto as number 1 in the paring list, designating a wireless intercommunication device connected after the slave wireless intercommunication device 1040 to be wirelessly connected thereto as number 2 in the pairing list, and sequentially designating the remaining wireless intercommunication devices as subsequent numbers in the pairing list, according to the chain connection order. Meanwhile, when the slave intercommunication device 1040 is the first in the chain connection order, the slave mobile device 1030 may sort the pairing list by designating the wireless intercommunication device connected after the slave intercommunication device 1040 as number 1 in the pairing list and sequentially designating the remaining wireless intercommunication devices as subsequent numbers in the pairing list. In addition, when the slave intercommunication device 1040 is the last in the chain connection order, the slave mobile device 1030 may sort the pairing list by designating the wireless intercommunication device connected before the slave intercommunication device 1040 as number 1 in the pairing list and sequentially designating the remaining wireless intercommunication devices as subsequent numbers in the pairing list.

When the master wireless intercommunication device 1020 is wirelessly connected to the master mobile device 1010, the master mobile device 1010 may transmit the sorted pairing list and the chain connection order information to the master wireless intercommunication device 1020 wirelessly connected thereto (1006), and the master wireless intercommunication device 1020 may receive the pairing list and the chain connection order information and generate a pairing list or update an existing pairing list (1007).

When the slave wireless intercommunication device 1040 is wirelessly connected to the slave mobile device 1030, the slave mobile device 1030 may transmit the sorted pairing list and the chain connection order information to the slave wireless intercommunication device 1040 wirelessly connected thereto (1008), and the slave wireless intercommunication device 1040 may receive the pairing list and the chain connection order information and generate a pairing list or update an existing pairing list (1009).

An aspect of the present invention can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

The present invention has been described with reference to the exemplary embodiments. Those skilled in the art will appreciate that various modifications are possible without departing from the essential characteristic of the present invention. Accordingly, the disclosed exemplary embodiments need to be considered in an illustrative aspect, not a limiting aspect. Therefore, it shall be construed in such a manner that the scope of the present invention is not limited to the aforementioned exemplary embodiment, and includes the contents described in the accompanying claims and various implementations within the scope equivalent to the claims.

The invention claimed is:

1. A group pairing method of a wireless intercommunication system, comprising the steps of:
   acquiring information on a first slave wireless intercommunication device and generating a first pairing list using a master mobile device;
   generating a second pairing list by sorting the first pairing list according to a set connection order using the master mobile device;
   transmitting the second pairing list and information on the set connection order from the master mobile device to a master wireless intercommunication device;
   receiving in the master wireless intercommunication device the second pairing list and the information on the set connection order from the master mobile device and generating a third pairing list by updating an existing master wireless intercommunication device pairing list based on the received second pairing list using the master wireless intercommunication device;
   transmitting the third pairing list and the information on the set connection order from the master wireless intercommunication device to the first slave wireless intercommunication device;
   receiving in the first slave wireless intercommunication device the third pairing list and the information on the set connection order from the master wireless intercommunication device and generating a fourth pairing list by updating an existing slave wireless intercommunication device pairing list based on the received third pairing list using the first slave wireless intercommunication device;

generating a fifth pairing list by updating the fourth pairing list according to the information on the set connection order using the first slave wireless intercommunication device, transmitting the third pairing list and information on the set connection order from the master wireless intercommunication device to a second slave wireless intercommunication device, and receiving in the second slave wireless intercommunication device the third pairing list and the information on the set connection order from the master wireless intercommunication device, and generating a sixth pairing list according to information on the set connection order using the second slave wireless intercommunication device, and wherein the master wireless intercommunication device, the first slave intercommunication device, and the second slave wireless intercommunication device are wirelessly connected in series in the set connection order according to a predetermined command to form an intercommunication group to perform multipoint communication.

2. The group pairing method of claim 1, wherein the step of acquiring the information on the first slave wireless intercommunication device and generating the first pairing list using the master mobile device comprises acquiring the information on the first slave wireless intercommunication device using at least one of quick response (QR) code, Bluetooth communication, text message, or instant message.

3. The group pairing method of claim 1, wherein the step of acquiring the information on the first slave wireless intercommunication device and generating the first pairing list using the master mobile device comprises acquiring the information on the first slave wireless intercommunication device through an inquiry scan method.

4. The group pairing method of claim 1, wherein the step of generating the second pairing list by sorting the first pairing list according to the set connection order using the master mobile device comprises designating the first slave wireless intercommunication device connected before the master wireless intercommunication device as number 1 in the pairing list and designating the second slave wireless intercommunication device after the master wireless intercommunication device as number 2 in the pairing list, with reference to the set connection order.

5. The group pairing method of claim 1, further comprising the step of the first slave wireless intercommunication device transmitting the fifth pairing list to a first slave mobile device, and the step of the second slave wireless intercommunication device transmitting the sixth pairing list to a second slave mobile device.

6. A group pairing method of a wireless intercommunication system, comprising the steps of:

acquiring information on a slave wireless intercommunication device and generating a first pairing list using a master mobile device;

generating a second pairing list by sorting the generated first pairing list according to a set connection order using the master mobile device;

transmitting the second pairing list and information on the set connection order from the master mobile device to a slave mobile device;

receiving the second pairing list and the information on the set connection order from the master mobile device, generating a third pairing list by updating an existing pairing list, and generating a fourth pairing list by sorting the third pairing list according to the information on the set connection order using the slave mobile device;

transmitting the second pairing list and the information on the set connection order from the master mobile device to a master wireless intercommunication device when the master wireless intercommunication device is wirelessly connected to the master mobile device;

transmitting the fourth pairing list and the information on the set connection order from the slave mobile device to a slave wireless intercommunication device when the slave wireless intercommunication device is wirelessly connected to the slave mobile device;

wherein the master wireless intercommunication device is wirelessly connected to the slave wireless intercommunication device and the slave wireless intercommunication device is wirelessly connected to another slave wireless intercommunication device, and wherein the master wireless communication device, the slave wireless intercommunication device, and the another slave wireless intercommunication device are wirelessly connected in series in the set connection order according to a predetermined command to form an intercommunication group to perform multipoint communication.

* * * * *